Jan. 26, 1960    H. LEBOUTET    2,922,955
DETECTING AND MEASURING DEVICES FOR MILLIMETER WAVES
Filed May 27, 1954    2 Sheets-Sheet 1

Jan. 26, 1960 H. LEBOUTET 2,922,955
DETECTING AND MEASURING DEVICES FOR MILLIMETER WAVES
Filed May 27, 1954 2 Sheets-Sheet 2

United States Patent Office 2,922,955
Patented Jan. 26, 1960

2,922,955

DETECTING AND MEASURING DEVICES FOR MILLIMETER WAVES

Hubert Leboutet, Paris, France, assignor to Compagnie Generale de Telegraphie Sans Fil, a corporation of France Application May 27, 1954, Serial No. 432,815

Claims priority, application France May 30, 1953

3 Claims. (Cl. 331—76)

The detection of millimeter waves and power measurements at the corresponding frequencies set forth difficult problems.

Thus, it is difficult to achieve impedance matching of crystal detectors in wave guides along the same lines, as in the case of centimeter waves. The probes, probe-holders and crystals are of large dimensions with respect to millimeter wave guides and, as a result, display parasitic reactances of very high value.

Now, millimeter wave generators have generally an output which does not exceed about ten microwatts. If accurate measurements are to be effected, it is essential that a substantial part of the generator energy reaches the rectifying contact, or the measuring device for instance the bolometer, concerned. Therefore adequate impedance matching is necessary.

It is an object of the present invention to provide an arrangement enabling adequate impedance matching of a load in the millimeter wave range.

According to the invention, the probe, or other connection between the load and a millimeter wave guide, is used as the internal conductor of a coaxial line whose external conductor is a hollow cylinder, connected as a stub to said guide, said probe and load being slidably mounted within said cylinder.

The invention will be best understood from the following description and the attached drawing, in which.

Figure 1:
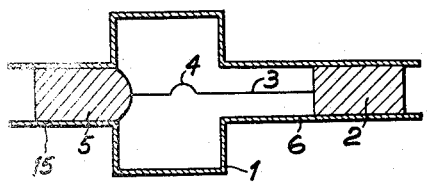
Figs. 1 and 2 show diagrammatically, respectively in transversal and in longitudinal sections, an embodiment of the invention.
Figure 2:
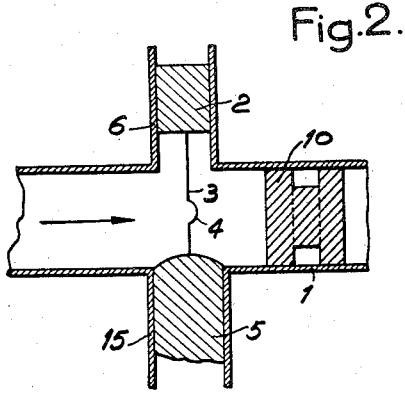

According to Figs. 1 and 2, a millimeter wave propagates in a guide 1, having a characteristic impedance $Z_0$, in the direction shown by the arrow.

A load 2 is connected to the guide 1 by means of a probe 3, comprising a loop 4.

The end of the probe 3 is supported by a cylindrical metallic holder 5, whose end is rounded off, the holder being housed in a hollow cylinder of rotation 15.

The load 2 is accommodated in a metallic cylinder of rotation 6 whose axis substantially coincides with the axis of both the wire 3 and the cylinder 15. A short circuiting piston 10 may be displaced inside the guide 1, beyond the assembly 2, 3, 4, 5.

As it may be readily seen, the assembly 3–6 makes up a coaxial line, with an inside conductor 3 and an outside conductor 6, series connected with the guide 1.

The assembly 2, 3, 4, 5 is movable inside the cylinders 6 and 15. By properly locating the assembly 2–5 in the cylinders 6 and 15 respectively and the piston 10 in the guide 1, the assembly 2, 3, 4, 5, as seen from the guide 1, will provide the impedance $Z_0$, i.e. will be matched to the guide. In this case, the whole energy propagating in the guide is absorbed by the load since no reflection takes place.

Figure 3:
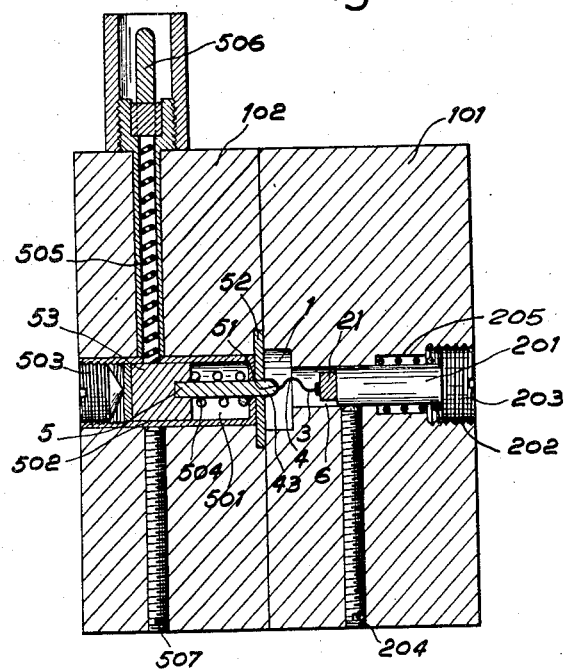
Fig. 3 shows in section a detecting device embodying the invention.

Fig. 3 shows, by way of example, in cross-section, an embodiment of a crystal detector mounted according to the invention.

The guide 1 is formed by a groove, having a rectangular section, is formed in a metal body 101, tightly closed by an other metallic body 102. The body 101 displays a hollow cylindrical cavity 6, whose axis is perpendicular to the larger wall of the guide and which communicates with the latter. In this cavity 6 is housed, coaxially therewith, a silicon crystal wafer 21. This crystal is welded to a cylindrical support 201 which fits exactly into the cavity 6. This support is threaded at 202 into the cavity 6 and comprises a slotted head 203. The position of the crystal 21 may thus be adjusted by means of a screw-driver. The crystal is then locked by means of a set screw 204. A spring 205 is compressed between the split head 203 and the body 101.

The crystal 2 is engaged by a wire 3 providing a rectifier contact. The wire is held in the axis of the cylinder 6 by a tantalum wire-holder 5. The end 51 of the wire-holder 5 is slidably mounted in a bore provided in a copper plate 52 which constitutes a part of the large wall of the guide 1, opposite the cavity 6. The wire end 51 is oxidized, to provide the necessary insulation between the plate 52 and the holder 51. In view of providing a wave trap, the thickness of the wall 52 is substantially equal to a quarter wavelength of the U.H.F. energy, which propagates in the guide 1.

The other end of the wire-holder 5 is carried by a metallic cylindrical body 53 which is slidably mounted within a cavity 501, coaxial with the cavity 6. This cavity is lined with an insulating material 502, such as polystyrene.

The adjustment in position of the cylinder 53 is performed by means of a member 503, threaded in the cavity 501 and of spring 504 mounted on the holder 5 and compressed between the cylinder 53 and the plate 52.

A D.C. output terminal 506 is connected to the cylinder 53 by means of a helical spring 505.

Figure 4:
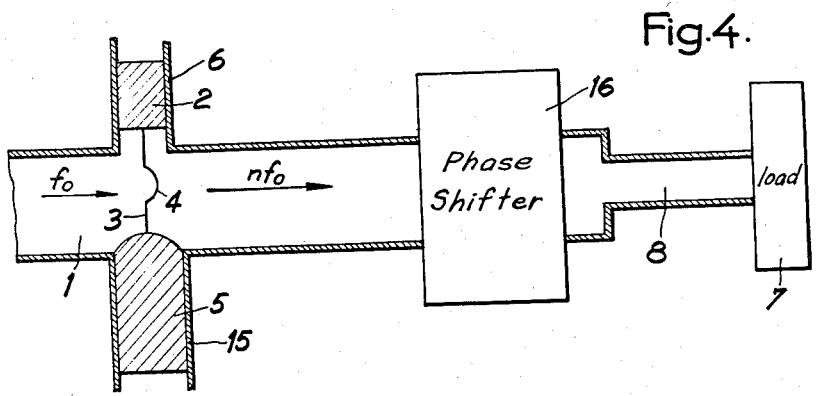
Fig. 4 shows diagrammatically a frequency multiplier according to the invention.

Fig. 4 shows diagrammatically how the arrangement according to the invention may be used for frequency multiplication. According to this figure, electromagnetic energy of $f_0$ frequency propagates in the direction of the arrow in the left-hand section of the guide 1 (Fig. 4). The right-hand end of the guide 1 terminates in a guide 8, loaded by a load 7, of smaller size than the guide 1 and in which the energy of $f_0$ frequency is unable to propagate, because the cut-off frequency of guide 8 is higher than the frequency $f_0$. A phase-shifter 16 is inserted in the guide 1 between the probe 4 and the guide 8.

The assembly operates as follows: at the input of the guide 8, a purely reactive impedance is opposed to the wave of $f_0$ frequency. The phase-shifter 16, which is known per se has for its purpose to vary the electric length of that portion of the guide 1 which is included between the probes and the guide 8.

As in previous examples, adjusting the phase shift introduced by the phase-shifter 16 and positioning of the assembly 2, 3, 4, 5 will make it possible to match the contact impedance of the crystal 2 to the generator (not shown) of the $f_0$ frequency wave. Since there is infinite impedance at the input of the guide 8, there is a short-circuit at a distance equal to $\lambda/4$ from this input. Adjusting the phase-shifter is tantamount to adjusting the position of the short circuiting piston 10 of Fig. 2.

Figure 5:
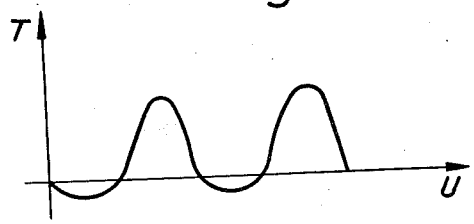
Fig. 5 shows very diagrammatically the detected wave.

Under these conditions, a periodic, non-sinusoidal voltage, whose variation plotted vs. time is shown in Fig. 5, occurs across the crystal 2, as a result of the rectifying properties of this crystal. This voltage contains a harmonic of $nf_0$ frequency. The crystal may thus be considered as a generator of $nf_0$ frequency energy and the load 7 must be matched to this generator 2. This matching can again be obtained by adjusting the phase-shifter and the position of the assembly 2–5.

This is possible because this latter matching is much more critical than the above mentioned one.

Figure 6:
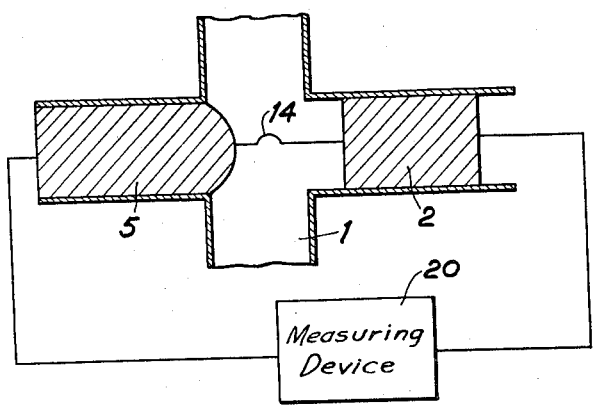
Fig. 6 shows diagrammatically a bolometer embodying the invention.

Fig. 6 shows in which way a power measuring mounting comprising for instance a bolometer 14 can be realized according to the invention.

The mounting is identical to that of Fig. 1 and the adjustment is effected along the same lines. A measuring device 20 indicates the bolometer resistance. As the latter is matched to the guide 1, the whole HF energy is dissipated therein.

What I claim is:

1. A circuit arrangement for matching a load to a millimeter wave guide comprising in combination: a hollow wave guide for millimeter waves; a hollow conducting cylinder of rotation opening in said guide and having an axis perpendicular to said guide; in said cylinder, a load having an input connection projecting into said guide and extending coaxially with said cylinder, a conductive load-supporting member, slidably mounted within said cylinder; short circuiting means in said guide, laterally located with respect to said cylinder; and means for varying the electric length of the guide portion comprised between said connection and said short-circuiting means.

2. A circuit arrangement for matching a load to a millimeter wave guide comprising in combination: a hollow wave guide for millimeter waves; a hollow conducting cylinder of rotation opening in said guide, and having an axis perpendicular to the axis of said guide; in said cylinder a detecting crystal having an input connection projecting into said guide and extending coaxially with said cylinder; a conductive crystal-supporting member, slidably mounted within said cylinder; short circuiting means in said guide laterally with respect to said cylinder; and means for varying the electric length of the guide portion comprised between said connection and said short circuiting means.

3. A circuit arrangement for matching a load to a first wave guide for millimeter waves of a first frequency comprising in combination: a first hollow wave guide for millimeter waves of a first frequency; a hollow conducting cylinder of rotation opening in said guide and having an axis perpendicular to the axis of said guide; in said cylinder, a detecting crystal having an input connection projecting into said guide and extending coaxially with said cylinder; a conductive load supporting member slidably mounted within said cylinder in prolongation of said first guide and opening into the same; a second hollow wave guide for propagating millimeter wave energy having a frequency, harmonic of said first frequency and for feeding said energy to a load; and phase shifting means inserted in said first guide between said second guide and said cylinder.

References Cited in the file of this patent

UNITED STATES PATENTS

| | | |
|---|---|---|
| 2,418,484 | Samuel | Apr. 8, 1947 |
| 2,482,973 | Gordon | Sept. 27, 1949 |
| 2,576,344 | Howard | Nov. 27, 1951 |
| 2,584,272 | Keiser et al. | Feb. 5, 1952 |
| 2,673,930 | Matare | Mar. 30, 1954 |
| 2,677,079 | McCreary | Apr. 27, 1954 |
| 2,685,028 | Ditchfield | July 27, 1954 |
| 2,731,561 | James et al. | Jan. 17, 1956 |
| 2,788,497 | Osial et al. | Apr. 9, 1957 |

FOREIGN PATENTS

| | | |
|---|---|---|
| 661,969 | Great Britain | Nov. 28, 1951 |